United States Patent
Norichika

(10) Patent No.: US 10,053,905 B2
(45) Date of Patent: Aug. 21, 2018

(54) VEHICLE COMMUNICATION SYSTEM AND MOBILE DEVICE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Oomi Norichika, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 15/738,161

(22) PCT Filed: Jun. 8, 2016

(86) PCT No.: PCT/JP2016/067091
§ 371 (c)(1),
(2) Date: Dec. 20, 2017

(87) PCT Pub. No.: WO2016/208397
PCT Pub. Date: Dec. 29, 2016

(65) Prior Publication Data
US 2018/0187473 A1  Jul. 5, 2018

(30) Foreign Application Priority Data

Jun. 23, 2015  (JP) .................................. 2015-125718

(51) Int. Cl.
*B60R 25/10* (2013.01)
*E05F 15/77* (2015.01)
(Continued)

(52) U.S. Cl.
CPC ............ *E05F 15/77* (2015.01); *B60R 25/246* (2013.01); *B60R 25/31* (2013.01); *H04W 4/44* (2018.02); *E05B 49/00* (2013.01)

(58) Field of Classification Search
CPC ..................................... E05F 1/00; E05Y 1/00
See application file for complete search history.

(56) References Cited

U.S. PATENT DOCUMENTS

| 2009/0030579 | A1  | 1/2009 | Takehisa | |
|---|---|---|---|---|
| 2011/0060480 | A1* | 3/2011 | Mottla | ................... G06Q 10/02 701/2 |
| 2015/0015396 | A1* | 1/2015 | Lunstedt | ................ B60R 25/04 340/545.1 |

FOREIGN PATENT DOCUMENTS

| JP | 2004-092342 A | 3/2004 |
|---|---|---|
| JP | 2010-173384 A | 8/2010 |

(Continued)

OTHER PUBLICATIONS

Search Report for PCT/JP2016/067091, dated Sep. 6, 2016.

*Primary Examiner* — Shirley Lu
(74) *Attorney, Agent, or Firm* — Honigman Miller Schwartz and Cohn LLP

(57) ABSTRACT

Provided is a vehicle communication system and a mobile device that make it possible to automatically open a vehicle door without impairing security or convenience. A vehicle communication system includes: an on-board device (1) that outputs a control signal for opening a vehicle door (D); and a mobile device (2) that transmits a reservation signal pertaining to a reservation for opening the vehicle door (D), to the on-board device (1), the on-board device (1) outputting the control signal by performing predetermined communication with the mobile device (2) upon receiving the reservation signal. The mobile device (2) includes: a mobile transmission unit that transmits the reservation signal; an (Continued)

acceptance unit that accepts an operation pertaining to transmission of the reservation signal; and a transmission control unit that causes the mobile transmission unit to repeatedly transmit the reservation signal upon the acceptance unit accepting the operation.

6 Claims, 8 Drawing Sheets

(51) Int. Cl.
    *B60R 25/24*     (2013.01)
    *H04W 4/44*     (2018.01)
    *B60R 25/31*     (2013.01)
    *E05B 49/00*     (2006.01)

(56) References Cited

FOREIGN PATENT DOCUMENTS

JP     2010-203087 A     9/2010
WO     2014-125650 A1     8/2014

* cited by examiner

VEHICLE COMMUNICATION SYSTEM AND MOBILE DEVICE

CROSS-REFERENCE TO RELATED APPLICATIONS

This application is the U.S. national stage of PCT/JP2016/067091 filed Jun. 8, 2016, which claims priority of Japanese Patent Application No. JP 2015-125718 filed Jun. 23, 2015.

TECHNICAL FIELD

The present application relates to a vehicle communication system that outputs a control signal for opening a vehicle door, based on a reservation signal pertaining to a reservation for opening the vehicle door, and a mobile device that transmits the reservation signal.

BACKGROUND

There is a conventionally-known method according to which a mobile device outputs a signal, and an on-board device that has received the signal performs specific control on a vehicle door. JP 2001-234653A discloses a method according to which a mobile device periodically transmits an unlock request signal, and an on-board device that has received the unlock request signal unlocks a vehicle door after performing authentication on the mobile device based on the signal.

Also, JP 2009-24454A discloses a method according to which a mobile device (an instruction apparatus) transmits a reservation signal based on an operation input by a user, and an on-board device (a vehicle-side control apparatus) that has received the reservation signal detects whether or not the user is present near a vehicle door, and opens the vehicle door upon detecting the presence of the user.

However, with the method disclosed in JP 2001-234653A, the mobile device keeps regularly transmitting the unlock request signal while the mobile device is turned ON. Therefore, the on-board device unlocks the vehicle door even if the user does not intend to unlock the vehicle door, which is undesirable in terms of security. Also, with the method disclosed in JP 2009-24454A, the user cannot check whether or not the on-board device has properly received the reservation signal. Therefore, with the method disclosed in JP 2009-24454A, there is a problem in which, although the user has moved closer to a vehicle door after causing the mobile device to transmit a reservation signal, the user cannot open the vehicle door because the on-board device could not receive the reservation signal, thus degrading the convenience.

An object of the present application is to provide a vehicle communication system and a mobile device that make it possible to automatically open a vehicle door without impairing security or convenience.

SUMMARY

A vehicle communication system according to one aspect of the present invention is a vehicle communication system including: an on-board device that outputs a control signal for opening a vehicle door; and a mobile device that transmits a reservation signal pertaining to a reservation for opening the vehicle door to the on-board device, the on-board device outputting the control signal by performing predetermined communication with the mobile device upon receiving the reservation signal. The mobile device includes: a mobile transmission unit that transmits the reservation signal; an acceptance unit that accepts an operation pertaining to transmission of the reservation signal; and a transmission control unit that causes the mobile transmission unit to repeatedly transmit the reservation signal upon the acceptance unit accepting the operation.

A mobile device according to one aspect of the present invention is a mobile device that transmits, to an on-board device that outputs a control single for opening a vehicle door, a reservation signal pertaining to a reservation for opening the vehicle door, the mobile device including: a mobile transmission unit that transmits the reservation signal; an acceptance unit that accepts an operation pertaining to transmission of the reservation signal; and a transmission control unit that causes the mobile transmission unit to repeatedly transmit the reservation signal upon the acceptance unit accepting the operation.

Note that the present application can be realized not only as a vehicle communication system and a mobile device that are provided with such characteristic processing units, but also as a vehicle communication method that includes the steps of performing such characteristic processing, and can be realized as a program for causing a computer to execute such steps. Also, the present application can be realized as a semiconductor integrated circuit that realizes part or all of the vehicle communication system and the mobile device, and can be realized as another system that includes the vehicle communication system and the mobile device.

Advantageous Effects of Invention

With the configurations above, it is possible to provide a vehicle communication system and a mobile device that make it possible to automatically open a vehicle door without impairing security or convenience.

DETAILED DESCRIPTION OF PREFERRED EMBODIMENTS

Figure 1:
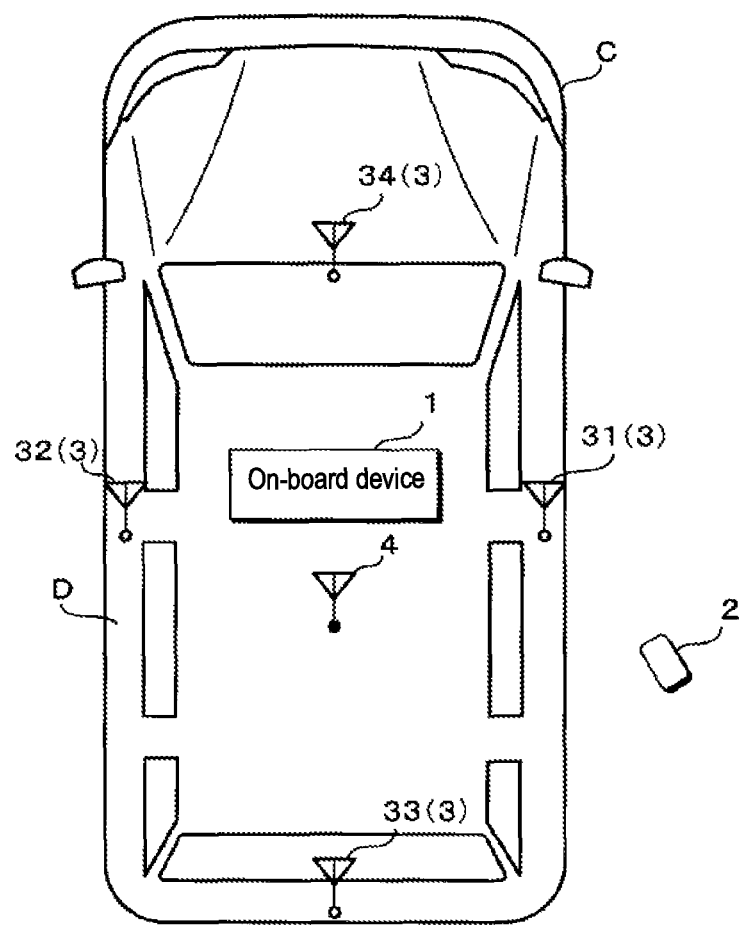
FIG. 1 is a schematic diagram showing an example of a configuration of a vehicle communication system according to an embodiment.

First, embodiments of the present invention will be listed and described. It is possible to combine at least some of the embodiments shown below as appropriate.

(1) A vehicle communication system according to one aspect of the present invention is a vehicle communication system including: an on-board device that outputs a control signal for opening a vehicle door; and a mobile device that transmits a reservation signal pertaining to a reservation for opening the vehicle door to the on-board device, the on-board device outputting the control signal by performing predetermined communication with the mobile device upon receiving the reservation signal. The mobile device includes: a mobile transmission unit that transmits the reservation signal; an acceptance unit that accepts an operation pertaining to transmission of the reservation signal; and a transmission control unit that causes the mobile transmission unit to repeatedly transmit the reservation signal upon the acceptance unit accepting the operation.

In the present application, the mobile device transmits a reservation signal, using the mobile transmission unit. The mobile device accepts an operation pertaining to transmission of a reservation signal, using the acceptance unit. The mobile device causes the mobile transmission unit to repeatedly transmit the reservation signal, using the transmission control unit, upon the acceptance unit accepting the operation. The mobile device does not transmit the reservation signal if the user does not operate the acceptance unit. Therefore, it is possible to prevent the user from unintentionally opening the vehicle door, and the vehicle communication system according to the present aspect does not impair security. Also, even if the on-board device receives a reservation signal that has been transmitted from the mobile device due to the user erroneously causing the acceptance unit to accept an operation, the on-board device outputs a control signal for opening the vehicle door by performing predetermined communication, and therefore the vehicle communication system according to the present aspect does not impair security. The predetermined communication is, for example, communication pertaining to verification regarding whether or not the mobile device corresponds to the on-board device, communication pertaining to the detection of the location of the mobile device, or the like. Furthermore, since the mobile device repeatedly transmits a reservation signal, it is possible to enable the on-board device to more reliably receive a reservation signal. Therefore, even in the case where the user who is holding the mobile device causes the acceptance unit to accept an operation at a position that is away from the on-board device by a distance that is longer than the reach of a reservation signal, the user can enable a reservation signal to be received by the on-board device by thereafter moving to a position that is inside the reach of a reservation signal, to get into the vehicle. Therefore, it is possible to avoid a situation where the vehicle door does not automatically open even though a reservation signal has been transmitted in response to the acceptance unit accepting an operation, and thus the vehicle communication system according to the present aspect does not impair convenience.

(2) It is preferable that the mobile device further includes a timer that measures a period during which the reservation signal is repeatedly transmitted, and the transmission control unit does not cause the mobile transmission unit to transmit the reservation signal if the period measured by the timer is longer than or equal to a predetermined period.

In the present application, the mobile device measures a period during which the reservation signal is repeatedly transmitted, using the timer. The transmission control unit of the mobile device does not cause the mobile transmission unit to transmit the reservation signal if the period measured by the timer is longer than or equal to a predetermined period. Therefore, the mobile device transmits a reservation signal only during the predetermined period, and thus the mobile device can suppress the consumption of power from a power supply of the mobile device, such as an electrical cell or a battery.

(3) It is preferable that the on-board device includes: an on-board reception unit that receives the reservation signal; and an on-board transmission unit that transmits a position detection signal pertaining to detection of a position of the mobile device upon the on-board reception unit receiving the reservation signal, the mobile device further comprises a mobile reception unit that receives the position detection signal transmitted from the on-board transmission unit, and the transmission control unit does not cause the mobile transmission unit to transmit the reservation signal if the mobile reception unit receives the position detection signal.

In the present application, the on-board device receives a reservation signal, using the on-board reception unit. The on-board device transmits a position detection signal pertaining to the detection of the position of the mobile device, using the on-board transmission unit, upon the on-board reception unit receiving the reservation signal. The mobile device receives the position detection signal transmitted from the on-board transmission unit of the on-board device, using the immobile reception unit. The transmission control unit of the mobile device causes the mobile transmission unit to stop transmitting the reservation signal, upon the mobile reception unit receiving the position detection signal. Therefore, the mobile device detects that the on-board device has received a reservation signal, by receiving the position detection signal, and does not transmit a reservation signal after the detection. Thus, the mobile device can avoid unnecessary transmission of a reservation signal. Therefore, the mobile device can suppress the consumption of power from a power supply of the mobile device, such as an electrical cell or a battery.

(4) It is preferable that the transmission control unit causes the mobile transmission unit to transmit a response signal that corresponds to the position detection signal received by the mobile reception unit, the on-board reception unit is configured to receive the response signal, the on-board device further includes: a detection unit that detects a positional relationship between the mobile device and a vehicle on which the on-board device is mounted, upon the on-board reception unit receiving the response signal, based on the received response signal; and an output unit that outputs the control signal for opening the vehicle door if the positional relationship detected by the detection unit indicates that a distance between the mobile device and the vehicle is shorter than or equal to a predetermined distance.

In the present application, the transmission control unit of the mobile terminal causes the mobile transmission unit to transmit a response signal that corresponds to the position detection signal received by the mobile reception unit. The on-board device received the response signal, using the on-board reception unit. Upon the on-board reception unit receiving the response signal, the on-board device detects the positional relationship between the mobile device and the on-board device or the vehicle on which the on-board device is mounted, based on the receive response signal, using the detection unit. The on-board device outputs the control signal for opening the vehicle door, using the output unit, if the positional relationship detected by the detection unit indicates that the distance between the mobile device and the vehicle is shorter than or equal to a predetermined distance. Therefore, the on-board device can perform control to open the vehicle door on the condition that the positional relationship between the vehicle and the mobile device, detected by the detection unit, indicates a positional relationship in which the user who is holding the mobile device is present at a position that is away from the vehicle by a distance that is shorter than or equal to the predetermined distance. Therefore, it is possible to perform more flexible control compared to control that is performed to open the vehicle door simply depending on whether or not the mobile device is present within a predetermined communication range.

(5) It is preferable that the mobile transmission unit is configured to transmit an activation signal for activating a driving source of a vehicle on which the on-board device is mounted, to the vehicle.

In the present application, the mobile transmission unit of the mobile device transmits an activation signal for activating a driving source of a vehicle on which the on-board device is mounted, to the vehicle. Therefore, by using a radio wave for transmitting the activation signal to transmit the reservation signal, for example, the mobile device according to the present application can be formed using an existing communication device for a vehicle.

(6) A mobile device according to one aspect of the present invention is a mobile device that transmits, to an on-board device that outputs a control single for opening a vehicle door, a reservation signal pertaining to a reservation for opening the vehicle door, the mobile device including: a mobile transmission unit that transmits the reservation signal; an acceptance unit that accepts an operation pertaining to transmission of the reservation signal; and a transmission control unit that causes the mobile transmission unit to repeatedly transmit the reservation signal upon the acceptance unit accepting the operation.

In the present application, the mobile transmission unit transmits a reservation signal. The acceptance unit accepts an operation pertaining to the transmission of the reservation signal. The transmission control unit causes the mobile transmission unit to repeatedly transmit the reservation signal upon the acceptance unit accepting the operation. Therefore, the mobile device does not transmit the reservation signal if the user does not cause the acceptance unit to accept an operation. Therefore, it is possible to prevent the user from unintentionally opening the vehicle door, and the vehicle communication system according to the present aspect does not impair security. Also, since the mobile device repeatedly transmits a reservation signal, it is possible to enable the on-board device to more reliably receive a reservation signal. Therefore, even in the case where the user who is holding the mobile device causes the acceptance unit to accept an operation at a position that is away from the on-board device by a distance that is longer than the reach of a reservation signal, the user can enable a reservation signal to be received by the on-board device by thereafter moving to a position that is inside the reach of a reservation signal to get on the vehicle. Therefore, it is possible to avoid a situation where the vehicle door does not automatically open even though a reservation signal has been transmitted in response to the acceptance unit accepting an operation, and thus the vehicle communication system according to the present aspect does not impair convenience.

(7) It is preferable that mobile device further includes: a mobile reception unit that receives a signal that has been transmitted from the on-board device that has received the reservation signal, and if the mobile reception unit receives the signal, the transmission control unit does not cause the mobile transmission unit to transmit the reservation signal.

In the present application, the mobile reception unit receives a signal that has been transmitted from the on-board device that has received the reservation signal. If the mobile reception unit receives the signal from the on-board device, the transmission control unit does not cause the mobile transmission unit to transmit the reservation signal. Therefore, the mobile device detects that the on-board device has received a reservation signal, by receiving the signal from the on-board device, and does not transmit a reservation signal after detection. Thus, the mobile device can avoid unnecessary transmission of a reservation signal. Therefore, the mobile device can suppress the consumption of power from a power supply of the mobile device, such as an electrical cell or a battery.

(8) It is preferable that the mobile transmission unit is configured to transmit an activation signal for activating a driving source of a vehicle on which the on-board device is mounted, to the vehicle.

In the present application, the mobile transmission unit of the mobile device transmits an activation signal for activating a driving source of a vehicle on which the on-board device is mounted, to the vehicle. Therefore, by using a radio wave for transmitting the activation signal to transmit the reservation signal, for example, the mobile device according to the present application can be formed using an existing communication device for a vehicle.

The following describes specific examples of a vehicle communication system and a mobile device according to an embodiment of the present invention with reference to the drawings. Note that the present invention is not limited to these examples. The scope of the present invention is indicated by the claims, and all changes which fall within the meaning and range of equivalency of the claims are intended to be embraced therein.

FIG. 1 is a schematic diagram showing an example of a configuration of a vehicle communication system according to the present embodiment. A vehicle communication system according to the present embodiment includes: an on-board device 1 that transmits and receives various kinds of signals via a plurality of LF transmission antennas 3 and an RF reception antenna 4, which are provided on a vehicle C; and a mobile device 2 that transmits and receives the signals to and from the on-board device 1. The on-board device 1 detects a positional relationship between the vehicle C and the mobile device 2 upon receiving a reservation signal, which will be described later, from the mobile device 2 via the RF reception antenna 4, and automatically opens a sliding door D that is provided in the vehicle C, based on the detected positional relationship. The sliding door D is provided on the passenger seat side in a rear portion of the vehicle C, for example. An additional sliding door D may be provided on the driver seat side in the rear portion, and the positions and the number of the sliding doors D are not specifically limited. Note that the left side of the vehicle C facing in the travelling direction is the passenger seat side, and the right side of the vehicle C facing in the travelling direction is the driver seat side.

The plurality of LF transmission antennas 3 include, for example: a first LF transmission antenna 31 that is provided on a driver seat side pillar; a second LF transmission antenna 32 that is provided on a passenger seat side pillar; a third LF transmission antenna 33 that is provided in the rear portion of the vehicle C; and a fourth LF transmission antenna 34 that is provided in a front portion of the vehicle C. Each LF transmission antenna 3 transmits signals using, for example, a radio wave in the LF (Low Frequency) band of 30 kHz to 300 MHz.

Figure 2:
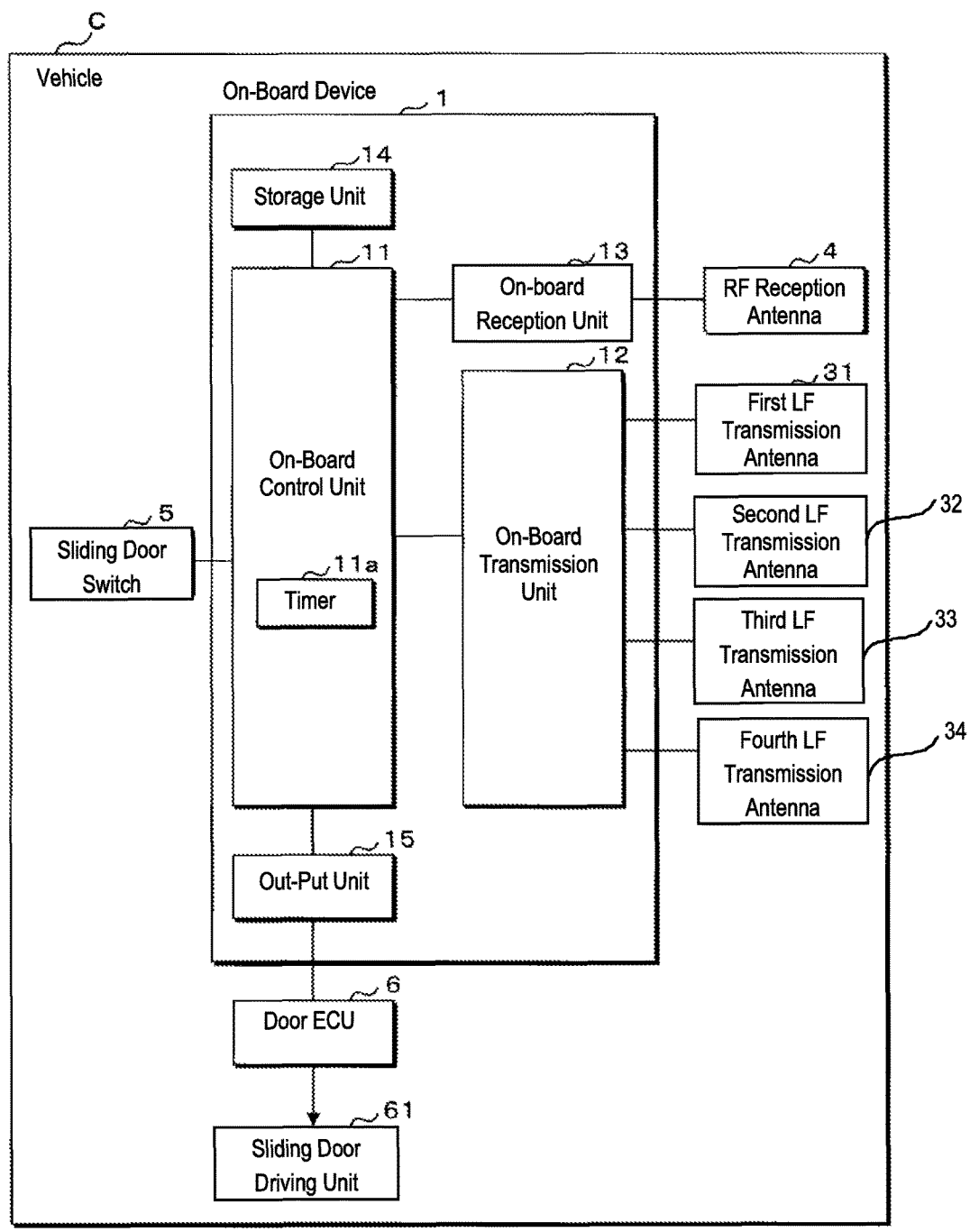
FIG. 2 is a block diagram showing an example of a configuration of an on-board device.

FIG. 2 is a block diagram showing an example of the configuration of the on-board device 1. An on-board control unit 11 is a computer that includes, for example, one or more CPUs (Central Processing Units), a multi-core CPU, a ROM (Read Only Memory), a RAM (Random Access Memory), an input/output interface, and a timer 11*a*. The CPUs of the on-board control unit 11 are connected to an on-board transmission unit 12, an on-board reception unit 13, a storage unit 14, and an output unit 15 via the input/output interface. The on-board control unit 11 executes the below-described control program that is stored in the storage unit 14 to control the operations of each constituent unit, to detect the positional relationship between the vehicle C and the mobile device 2, and to provide an instruction to open the sliding door D based on the detected positional relationship.

The storage unit 14 is a non-volatile memory such as an EEPROM (Electrically Erasable Programmable ROM) or a flash memory. The storage unit 14 stores a control program that enables the on-board control unit 11 to control the operations of each constituent units of the on-board device 1, to detect the positional relationship between the vehicle C and the mobile device 2, and to provide an instruction to open the sliding door D.

The storage unit 14 also stores a predetermined positional relationship of the mobile device 2 relative to the vehicle C, which serves as a condition for providing an instruction to open the sliding door D. The predetermined positional relationship includes, for example, a distance from the vehicle C to the mobile device 2, and the direction of the mobile device 2 relative to the vehicle C. For example, the storage unit 14 stores information indicating a range of 3 m or less from the outer surface of the sliding door D in a direction in which the outer surface faces, as information indicating the predetermined positional relationship. Although an example in which the positional relationship has been stored in the storage unit 14 in advance will be described in the present embodiment, a configuration that allows a user to store a given positional relationship in the storage unit 14 may be employed. Although the on-board control unit 11 and the storage unit 14 in FIG. 2 are illustrated as separate constituent units, the storage unit 14 may be provided inside the on-board control unit 11.

The on-board transmission unit 12 is connected to the plurality of LF transmission antennas 3, and transmits a position detection signal for detecting the positional relationship between the vehicle C and the mobile device 2, from each LF transmission antenna 3 according to control that is performed by the on-board control unit 11. The position detection signal is, for example, a signal that requests the mobile device 2 to detect a reception signal strength, and to transmit a response signal that contains the detected reception signal strength. The position detection signal corresponds to the request signal.

The on-board reception unit 13 is connected to the RF reception antenna 4, receives various kinds of signals that include a reservation signal and a response signal that have been transmitted from the mobile device 2 using a radio wave in the UHF (Ultra High Frequency) band of 300 MHz to 3 GHz, and outputs the signals to the on-board control unit 11. Since the communicable range of radio waves in the UHF band is wide, the position of the RF reception antenna 4 in the vehicle C is not specifically limited.

A door ECU 6 is connected to the output unit 15, and the output unit 15 outputs a control signal for opening and closing the sliding door D according to control that is performed by the on-board control unit 11. Specifically, the output unit 15 outputs, to the door ECU 6, a door open instruction signal that provides an instruction to open the sliding door D, and a door close instruction signal that provides an instruction to close the sliding door D. The door ECU 6 drives a sliding door driving unit 61 to open the sliding door D according to the door open instruction signal output from the output unit 15 of the on-board device 1. Similarly, the door ECU 6 drives the sliding door driving unit 61 to close the sliding door D according to the door close instruction signal output from the output unit 15 of the on-board device 1. The sliding door D includes a sliding door portion and a slide mechanism that moves the sliding door portion in a door opening direction or a door closing direction, and the sliding door driving unit 61 is provided with a power source such as a motor for driving the slide mechanism. The sliding door driving unit 61 drives the slide mechanism using the motor to move the sliding door portion in the door opening direction or the door closing direction.

Also, a sliding door switch 5 is connected to the on-board control unit 11, and a door signal that corresponds to the operational state of the sliding door switch 5 is input to the on-board control unit 11. The on-board control unit 11 can recognize the operational state of the sliding door switch 5 based on the door signal from the sliding door switch 5. Upon the sliding door switch 5 being operated, the on-board control unit 11 transmits a door open instruction signal or a door close instruction signal to the door ECU 6 using the output unit 15, to open or close the sliding door D.

Figure 3:
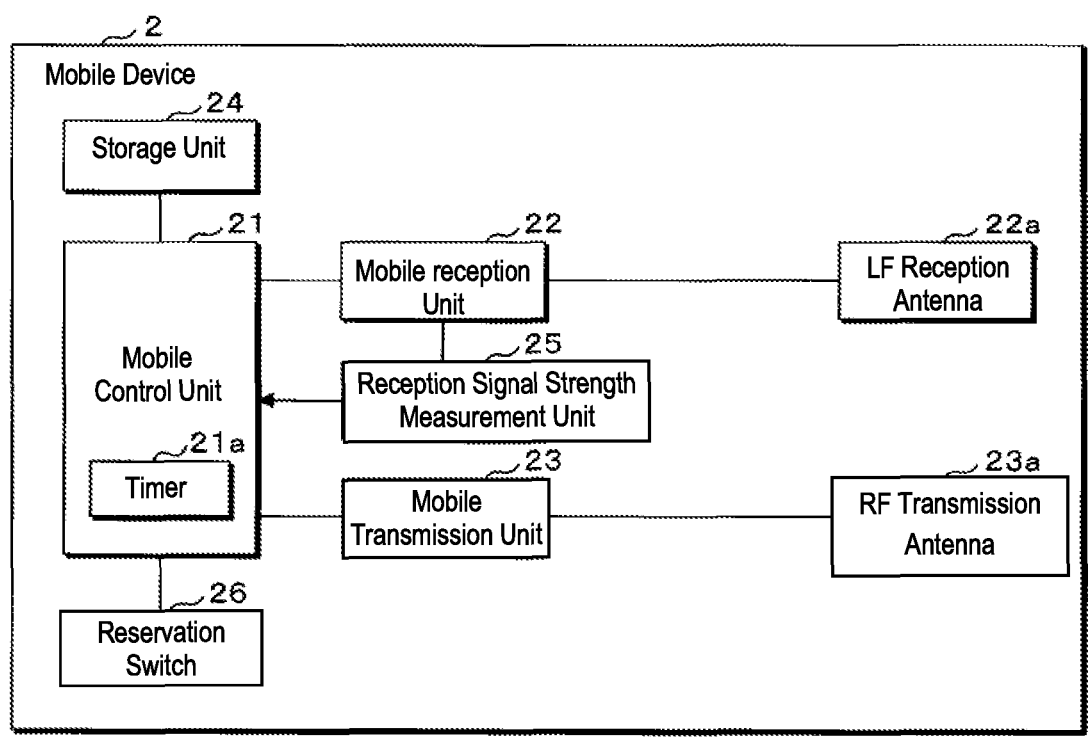
FIG. 3 is a block diagram showing an example of a configuration of a mobile device.

FIG. 3 is a block diagram showing an example of the configuration of the mobile device 2. The mobile device 2 includes a mobile control unit 21 that controls the operations of each constituent unit of the mobile device 2. The mobile control unit 21 is a microcomputer that includes, for example, one or more CPUs, a multi-core CPU, and a timer 21*a*. A mobile reception unit 22, a mobile transmission unit 23, a storage unit 24, a reception signal strength measurement unit 25, and a reservation switch 26 are connected to the CPUs of the mobile control unit 21 via an input/output interface. The mobile device 2 operates using a battery (not shown) as a power source, for example.

The mobile control unit 21 executes processing to transmit various kinds of signals including a reservation signal and a response signal, by reading out the below-described control program that is stored in the storage unit 24 and controlling the operations of each constituent unit.

The storage unit 24 is a non-volatile memory that is similar to the storage unit 14. The storage unit 24 stores a control program that enables the mobile control unit 21 to control each constituent unit of the mobile device 2 to execute processing to transmit various kinds of signals including a reservation signal and a response signal.

The mobile reception unit 22 is connected to an LF reception antenna 22*a*, receives a position detection signal that has been transmitted from the on-board device 1 using a radio wave in the LF band, and outputs the position detection signal to the mobile control unit 21. The LF reception antenna 22*a* is a three-axis antenna, for example, and can acquire signals of a certain reception signal strength regardless of the direction or orientation of the mobile device 2 relative to the vehicle C.

The reception signal strength measurement unit 25 is a circuit that detects the reception signal strength of each of the position detection signals that have been transmitted from the plurality of LF transmission antennas 3 and have been received by the LF reception antenna 22*a*, and outputs the detected reception signal strengths to the mobile control unit 21.

The mobile transmission unit 23 is connected to an RF transmission antenna 23*a*, and transmits a signal that corresponds to a signal that has been transmitted from the mobile device 2, according to control that is performed by the mobile control unit 21. Specifically, upon the below-described reservation switch 26 being operated, the mobile transmission unit 23 periodically transmits a reservation signal using a radio wave in the UHF band, according to control that is performed by the mobile control unit 21. A reservation signal is a signal for causing the on-board device 1 to start detecting the positional relationship between the vehicle C and the mobile device 2.

Also, upon the mobile device 2 receiving a position detection signal, the mobile transmission unit 23 transmits a response signal using a radio wave in the UHF band, according to control that is performed by the mobile control unit 21. A response signal contains the reception signal strength measured by the reception signal strength measurement unit 25, which is information for the on-board device 1 to detect the positional relationship between the vehicle C and the mobile device 2.

Furthermore, the mobile transmission unit 23 transmits, to the vehicle C, an activation signal for activating a driving source (not shown) of the vehicle C, such as an engine or a travelling motor, according to control that is performed by the mobile control unit 21. An activation signal is transmitted using a radio wave in the UHF band, for example.

Here, when transmitting a reservation signal and a response signal, the mobile transmission unit 23 uses a radio wave that is similar to the radio wave for an activation signal. A radio wave that is similar to the radio wave for an activation signal is, for example, similar in terms of frequency, strength, and modulation method. Note that the UHF band is an example of a radio wave band that is used to transmit a signal, and the radio wave band is not limited to the UHF band. Note that the mobile control unit 21 serves as the transmission control unit by executing the control program when causing the mobile transmission unit 23 to perform processing pertaining to the transmission of a reservation signal or a response signal.

The reservation switch 26 is connected to the mobile control unit 21. The reservation switch 26 inputs an operation signal to the mobile control unit 21 upon accepting an operation input by a user. Upon receiving an input operation signal, the mobile control unit 21 performs control to cause the mobile transmission unit 23 to transmit a reservation signal. More specifically, upon receiving an input operation signal, the mobile control unit 21 performs control to cause the mobile transmission unit 23 to transmit a reservation signal, every time a predetermined transmission period elapses. Although the predetermined transmission period is not intended to be specifically limited, the predetermined transmission period is preferably within the range of 1 second to 10 seconds, and is particularly preferably approximately 5 seconds. The reservation switch 26 corresponds to the acceptance unit.

Figure 4:
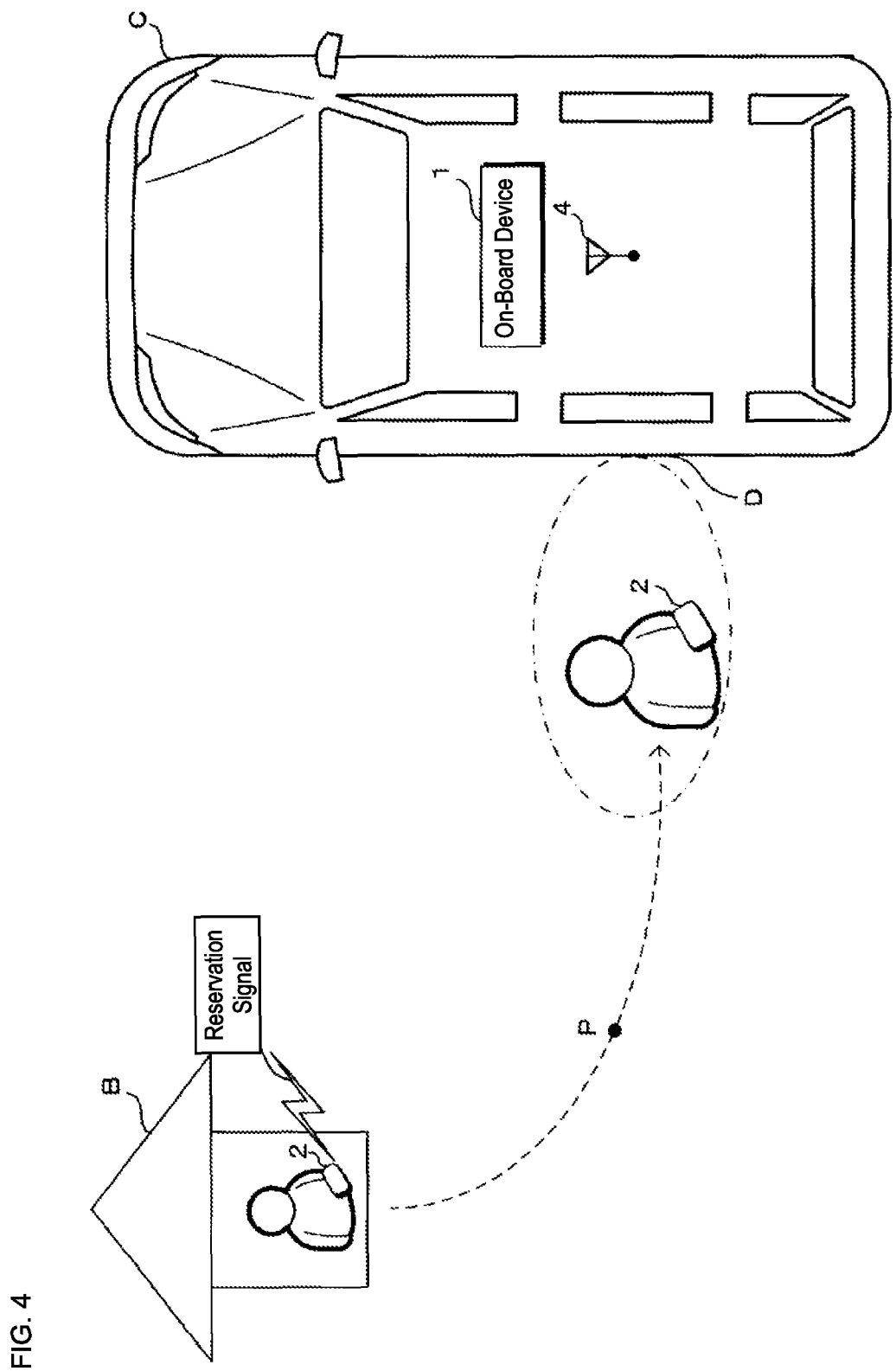
FIG. 4 is a conceptual diagram showing an example of usage of the vehicle communication system.

Next, an example of the usage of the vehicle communication system that has the above-described configuration will be described. FIG. 4 is a conceptual diagram showing an example of the usage of the vehicle communication system. The user holding the mobile device 2 operates the reservation switch 26 at a distance from the vehicle C, in a building B such as a house for example, and thereafter moves toward the vehicle C, holding the mobile device 2. In this regard, the user moves such that the positional relationship between the mobile device 2 and the vehicle C matches a predetermined positional relationship, thereby causing the on-board device 1 to open the sliding door D. The predetermined positional relationship is, for example, a relationship in which the mobile device 2 is present within the range of 3 m or less from the outer surface of the sliding door D in a direction in which the outer surface faces, i.e. within the range surrounded by a one-dot chain line in FIG. 4.

In the above-described usage example, the mobile device 2 detects that the reservation switch 26 is operated, and transmits a reservation signal every time the predetermined transmission period elapses. If the distance between the building B and the vehicle C is longer than the reach of the reservation signal, the on-board device 1 cannot receive the reservation signal transmitted by the mobile device 2. However, the mobile device 2 transmits a reservation signal every time the transmission period elapses. Therefore, if the user moves toward the vehicle C and the transmission period elapses when the user is present at a point where the distance to the vehicle C is within the reach of a reservation signal, e.g. a point P in FIG. 4, the on-board device 1 can receive the reservation signal transmitted by the mobile device 2. Therefore, the on-board device 1 can receive the reservation signal transmitted by the mobile device 2 regardless of the distance to the vehicle C at the time the reservation switch 26 is operated.

Also, the mobile device 2 according to the present embodiment stops the transmission of a reservation signal upon a predetermined period elapsing from the time when the mobile device 2 started transmitting a reservation signal, or upon the mobile device 2 receiving a position detection signal transmitted from the on-board device 1. The predetermined period is several minutes, e.g. five minutes.

Also, in the above-described usage example, the on-board device 1 repeatedly transmits a position detection signal upon receiving a reservation signal via the RF reception antenna 4. Upon the user holding the mobile device 2 entering the reach of a position detection signal, the on-board device 1 communicates with the mobile device 2, and detects the positional relationship between the vehicle C and the mobile device 2. The on-board device 1 determines whether or not the detected positional relationship matches the predetermined positional relationship stored in the storage unit 14. Upon determining that the positional relationship is not the predetermined positional relationship, the on-board device 1 transmits a position detection signal again, and determines whether or not the positional relationship of the mobile device 2 relative to the vehicle C matches the predetermined positional relationship as a result of the user moving. Upon determining that the positional relationship matches the predetermined positional relationship, the on-board device 1 causes the output unit 15 to output a door open instruction signal to open the sliding door D. That is, upon receiving a reservation signal transmitted from the mobile device 2, the on-board device 1 successively detects the positional relationship between the mobile device 2 and the vehicle C until the positional relationship of the mobile device 2 relative to the vehicle C matches the predetermined positional relationship, and opens the sliding door D when the positional relationship matches the predetermined positional relationship.

The on-board device 1 and the mobile device 2 respectively operate as described above, and the user can open the sliding door D without operating the sliding door switch 5. Therefore, the user can easily open the sliding door D even if both hands are full, for example. The following describes the details of processing procedures that are respectively performed by the mobile device 2 and the on-board device 1.

Figure 5:
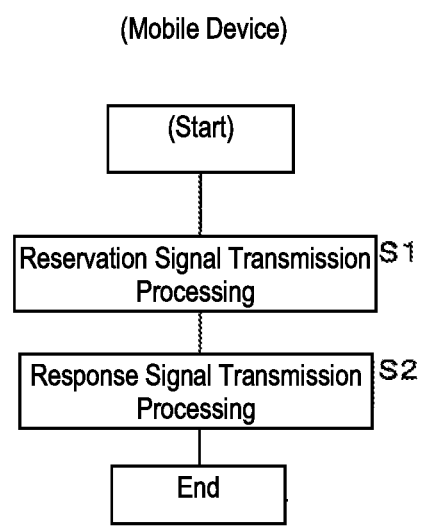
FIG. 5 is a flowchart showing processing procedures that are performed by the mobile device.

FIG. 5 is a flowchart showing processing procedures that are performed by the mobile device 2. The mobile control unit 21 of the mobile device 2 monitors the operational state of the reservation switch 26 by determining whether or not the reservation switch 26 has been operated by the user. The mobile control unit 21 performs the determination by, for example, determining whether or not an operation signal has been input thereto from the reservation switch 26.

Upon determining that the reservation switch 26 has been operated, the mobile control unit 21 executes reservation signal transmission processing (step S1). Reservation signal transmission processing is processing that is performed to periodically transmit a reservation signal as described above. The processing procedures therefor will be described later.

Subsequently, the mobile control unit 21 receives a position detection signal transmitted from the on-board device 1, and executes response signal transmission processing to transmit a response signal that contains the reception signal strength of the received position detection signal (step S2). Response signal transmission processing is processing that is performed to transmit a response signal that corresponds to the above-described position detection signal from the on-board device 1. The processing procedures therefor will be described later. It is not only when the reservation switch 26 is operated that response signal transmission processing is executed by the mobile device 2, but response signal transmission processing is executed all the time. FIG. 1 is a conceptual diagram showing a sequence of reservation signal transmission processing and response signal transmission processing that are performed when the reservation switch 26 is operated. It is not meant that response signal transmission processing is executed subsequent to reservation signal transmission processing that is triggered by the reservation switch 26 and thereafter the response signal transmission processing is completed.

Figure 6:
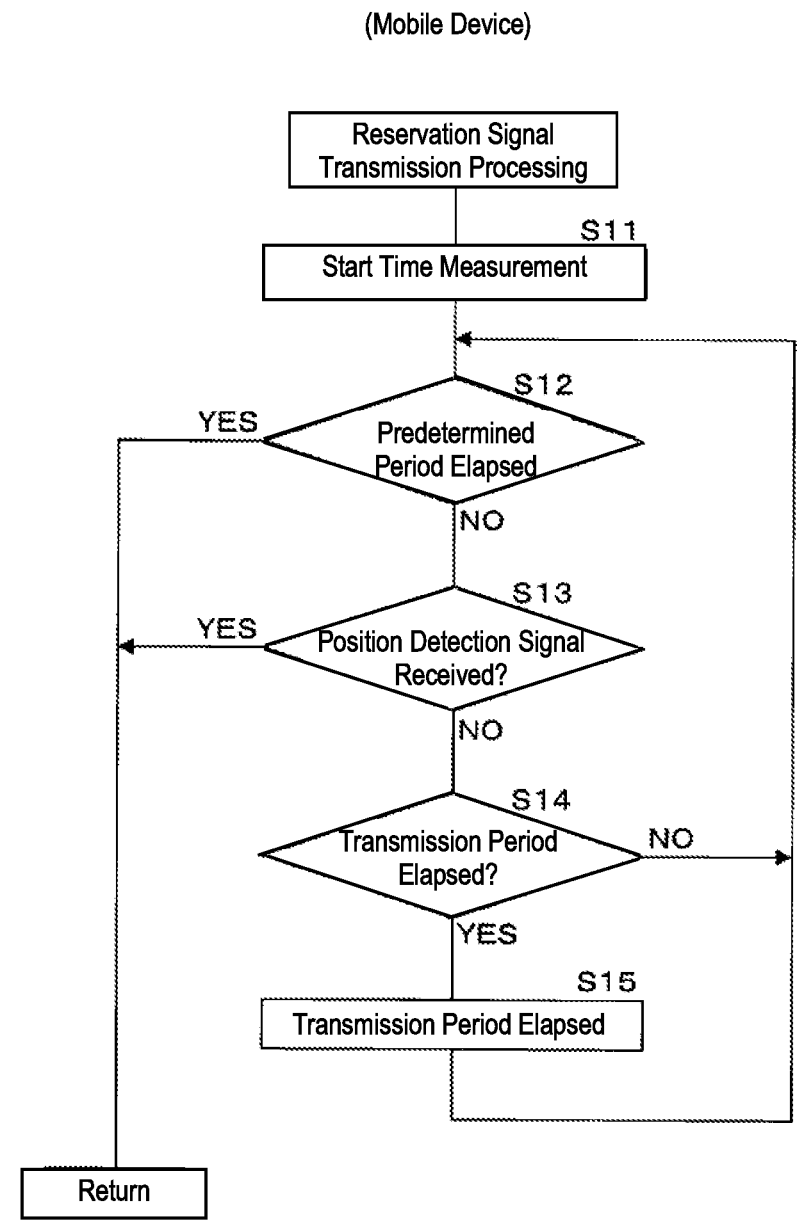
FIG. 6 is a flowchart showing a sub routine of reservation signal transmission processing.

FIG. 6 is a flowchart showing a sub routine of reservation signal transmission processing. The mobile control unit 21 of the mobile device 2 provides an instruction to the timer 21*a* to start time measurement (step S11). Subsequently, the mobile control unit 21 determines whether or not a predetermined period has elapsed since the time measurement was started (step S12). The predetermined period is several minutes, e.g. five minutes, as described above. Upon determining that the predetermined period has elapsed (S12: YES), the mobile control unit 21 ends reservation signal transmission processing. That is, if the time measured by the timer 21*a* is greater than or equal to the predetermined period, the mobile control unit 21 does not cause the mobile transmission unit 23 to transmit a reservation signal. Note that the timing at which the timer 21*a* starts time measurement is not necessarily the timing indicated by step S11 as long as the mobile control unit 21 provides an instruction such that the timer 21*a* can measure the period during which a reservation signal is repeatedly transmitted.

Upon determining that the predetermined period has not elapsed (S12: NO), the mobile control unit 21 determines whether or not the mobile control unit 21 has received a position detection signal (step S13). The mobile control unit 21 performs the determination based on, for example, information that is input thereto from the mobile reception unit 22. Upon determining that the mobile control unit 21 has received a position detection signal (S13: YES), the mobile control unit 21 ends reservation signal transmission processing. That is, if the mobile reception unit 22 receives a position detection signal, the mobile control unit 21 does not cause the mobile transmission unit 23 to transmit a reservation signal.

Upon determining that the mobile control unit 21 has not received a position detection signal (S13: NO), the mobile control unit 21 determines whether or not the transmission period of a reservation signal has elapsed (step S14). The mobile control unit 21 determines whether or not the transmission period has elapsed based on the result of time measurement performed by the timer 21*a*. Upon determining that the transmission period has not elapsed (S14: NO), the mobile control unit 21 returns processing to step S12.

Upon determining that the transmission period has elapsed (S14: YES), the mobile control unit 21 instructs the mobile transmission unit 23 to transmit a reservation signal (step S15). Thereafter, the mobile control unit 21 returns processing to step S12.

The mobile control unit 21 executes the above-described processing procedures for reservation signal transmission processing to instruct the mobile transmission unit 23 to repeatedly transmit a reservation signal every time the transmission period elapses, until the predetermined period elapses or the mobile control unit 21 receives a position detection signal.

Figure 7:
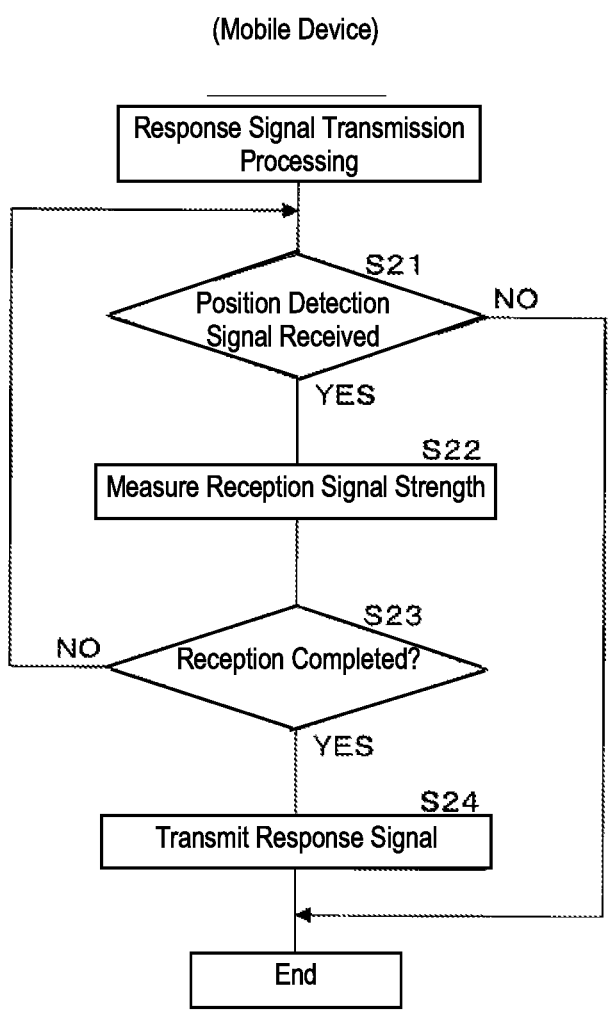
FIG. 7 is a flowchart showing a sub routine of response signal transmission processing.

FIG. 7 is a flowchart showing a sub routine of response signal transmission processing. The mobile control unit 21 of the mobile device 2 determines whether or not the mobile control unit 21 has received a position detection signal that has been transmitted from the on-board device 1 (step S21). Upon determining that the mobile control unit 21 has not received a position detection signal (S21: NO), the mobile control unit 21 ends response signal transmission processing.

Upon determining that the mobile control unit 21 has received a position detection signal (S21: YES), the mobile control unit 21 instructs the reception signal strength measurement unit 25 to measure the reception signal strength of the received position detection signal (step S22). Subsequently, the mobile control unit 21 determines whether or not the reception of position detection signals has been completed (step S23). The mobile control unit 21 determines whether or not the mobile control unit 21 has received all of the position detection signals that have been respectively transmitted from the first to fourth LF transmission antennas 31, 32, 33, and 34. For example, the mobile control unit 21 is configured to count the number of position detection signals that have been received, and determines whether or not the reception of position detection signal has been completed by determining whether or not the counted number is equal to the number of LF transmission antennas 3. Upon determining that the reception has not been completed (S23: NO), the mobile control unit 21 returns processing to step S21.

Upon determining that the reception has been completed (S23: YES), the mobile control unit 21 instructs the mobile transmission unit 23 to transmit a response signal (step S24). Specifically, the mobile control unit 21 instructs the mobile transmission unit 23 to transmit a response signal that includes the reception signal strengths of all of the position detection signals that have been respectively transmitted from the first to fourth LF transmission antennas 31, 32, 33, and 34. Thereafter, the mobile control unit 21 ends response signal transmission processing.

The mobile control unit 21 executes the above-described processing procedures for response signal transmission processing to cause the on-board device 1 to detect the positional relationship between the mobile device 2 and the vehicle C.

Figure 8:
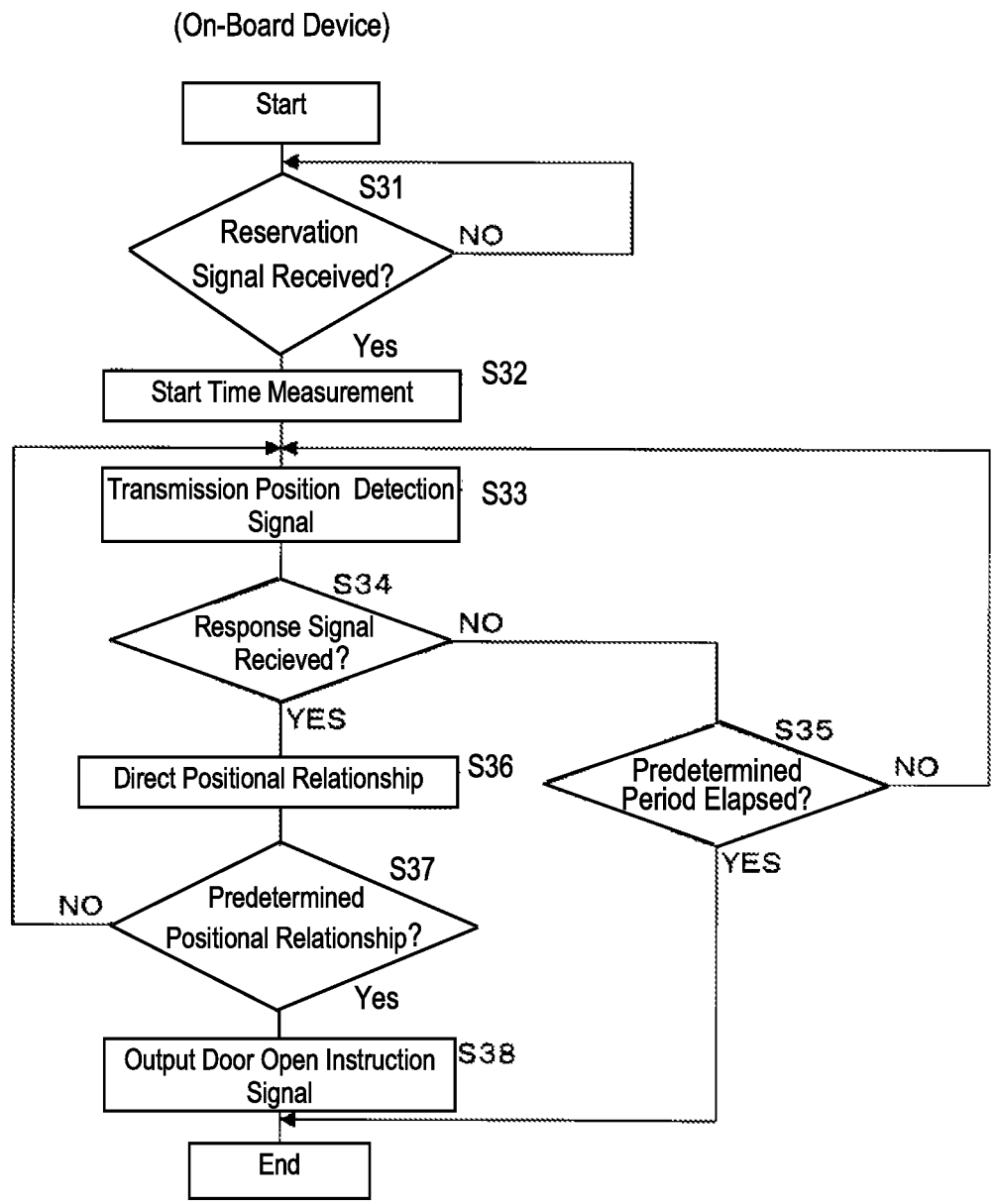
FIG. 8 is a flowchart showing processing procedures that are performed by the on-board device to open a sliding door based on a reservation signal from the mobile device.

Next, processing procedures that are performed by the on-board device 1 will be described. FIG. 8 is a flowchart showing processing procedures that are performed by the on-board device 1 to open the sliding door D based on a reservation signal from the mobile device 2. The on-board control unit 11 of the on-board device 1 determines whether or not the on-board reception unit 13 has received a reservation signal that has been transmitted from the mobile device 2 (step S31). The on-board control unit 11 performs the determination based on, for example, whether or not information that has been output from the on-board reception unit 13 contains information that indicates a reservation signal. Upon determining that the on-board reception unit 13 has not received a reservation signal (S31: NO), the on-board control unit 11 suspends processing until the on-board reception unit 13 receives a reservation signal.

Upon determining that the on-board reception unit 13 has received a reservation signal (S31: YES), the on-board control unit 11 instructs the timer 11a to start time measurement (step S32). Subsequently, the on-board control unit 11 causes the on-board transmission unit 12 to sequentially transmit position detection signals from the first to fourth LF transmission antennas 31, 32, 33, and 34 (step S33). The strength of the position detection signals transmitted from the first to fourth LF transmission antennas 31, 32, 33, and 34 is substantially the same. The on-board transmission unit 12 transmits a position detection signal from the first LF transmission antenna 31, and then transmits a position detection signal that has substantially the same strength as the aforementioned position detection signal, from the second LF transmission antenna 32. Similarly, the on-board transmission unit 12 transmits a position detection signal from the third LF transmission antenna 33, and then transmits a position detection signal from the fourth LF transmission antenna 34.

Subsequently, the on-board control unit 11 determines whether or not the on-board reception unit 13 has received a response signal that corresponds to the position detection signals from the mobile device 2 (step S34). Upon determining that the on-board reception unit 13 has not received a response signal (S34: NO), the on-board control unit 11 determines whether or not a predetermined period has elapsed since the reception of the reservation signal (step S35). The on-board control unit 11 performs the determination by, for example, determining whether or not the predetermined period has elapsed since the on-board control unit 11 caused the timer 11a to start time measurement in step S32. The predetermined period is ten minutes, for example. Upon determining that the predetermined period has elapsed (S35: YES), the on-board control unit 11 ends processing, and upon determining that the predetermined period has not elapsed (S35: NO), the on-board control unit 11 returns processing to step S33.

Through the processing performed in steps S32 to S35, a position detection signal is repeatedly transmitted from the on-board device 1 from when the reservation signal is received, until the predetermined period elapses, or until the positional relationship between the vehicle C and the mobile device 2 matches the predetermined positional relationship.

On the other hand, upon determining that the on-board reception unit 13 has received a response signal (S34: YES), the on-board control unit 11 detects the positional relationship between the vehicle C and the mobile device 2 based on the received response signal (step S36). The on-board control unit 11 detects the positional relationship between the vehicle C and the mobile device 2 by, for example, detecting the positional relationship between the mobile device 2 and each LF transmission antenna 3, based on the reception signal strengths contained in the response signal. In step S36, the on-board control unit 11 serves as the detection unit by executing the control program stored in the storage unit 14.

Subsequently, the on-board control unit 11 determines whether or not the detected positional relationship between the vehicle C and the mobile device 2 matches the predetermined positional relationship (step S37). The on-board control unit 11 determines whether or not the positional relationship matches the predetermined positional relationship by, for example, determining whether or not the mobile device 2 is present within the range of 3 m or less from the outer surface of the sliding door D in the direction in which the outer surface faces. Upon determining that the positional relationship does not match the predetermined positional relationship (S37: NO), the on-board control unit 11 returns processing to step S33. Upon determining that the positional relationship matches the predetermined positional relationship (S37: YES), the on-board control unit 11 causes the output unit 15 to output a door open instruction signal to the door ECU 6 (step S38), and thereafter ends processing.

Note that when returning processing from the processing in step S35 or step S37 to the processing in step S33, the on-board control unit 11 may transmit a position detection signal immediately after returning processing to step S33, or transmit a signal when a predetermined period has elapsed after performing the processing in step S33. The predetermined period is several seconds, e.g. two seconds. Furthermore, the on-board control unit 11 may use a different transmission interval of a position detection signal when returning processing from the processing in step S35 to the processing in step S33 and when returning processing from the processing in step S37 to the processing in step S33.

With the above-described configuration and processing, the mobile device 2 does not transmit a reservation signal if the user does not operate the reservation switch 26. Therefore, it is possible to prevent the user from unintentionally opening the sliding door D, and the vehicle communication system according to the present embodiment does not impair security. Also, even if the on-board device 1 receives a reservation signal that has been transmitted from the mobile device 2 due to the user erroneously operating the reservation switch 26, the on-board device 1 outputs a control signal for opening the sliding door D depending on the position of the mobile device 2, and therefore the vehicle communication system according to the present embodiment does not impair security.

Also, since the mobile device 2 repeatedly transmits a reservation signal, it is possible to enable the on-board device 1 to more reliably receive a reservation signal. Therefore, even in the case where the user holding the mobile device 2 operates the reservation switch 26 at a position that is away from the on-board device 1 by a distance that is longer than the reach of a reservation signal, the user can thereafter enable a reservation signal to be received by the on-board device 1 by moving to a position that is inside the reach of a reservation signal, to get into the vehicle C. Therefore, it is possible to avoid a situation where the sliding door D does not automatically open even though a reservation signal has been transmitted in response to the reservation switch 26 being operated, and thus the vehicle communication system according to the present embodiment does not impair convenience. Furthermore, in the case where the user does not intend to open the sliding door D, the user can avoid opening the sliding door D even when the user moves to a position where the predetermined positional relationship is satisfied, by not operating the reservation switch 26, and thus it is possible to prevent the sliding door D from being unnecessarily opened.

Also, the mobile device 2 transmits a reservation signal only during a predetermined period, and thus the mobile device 2 can suppress the consumption of power from a power supply of the mobile device 2, such as an electrical cell or battery.

Also, the mobile device 2 detects that the on-board device 1 has received a reservation signal, by receiving a position detection signal, and does not transmit a reservation signal after the detection. Thus, the mobile device 2 can avoid unnecessary transmission of a reservation signal. Therefore, the mobile device 2 can suppress the consumption of power from a power supply of the mobile device 2, such as an electrical cell or battery.

Also, since the mobile device 2 transmits a reservation signal and a response signal by using a radio wave that is similar to the radio wave for an activation signal, the mobile device 2 can be formed using a mobile device that can activate the driving source of the vehicle C, such as a so-called remote engine starter. Therefore, the mobile device 2 according to the present embodiment can increase the reach of each signal, compared to the case where the mobile device 2 is formed using a mobile device for a so-called keyless entry system. Note that the mobile device 2 may be formed using a mobile device for a so-called keyless entry system, or formed as a mobile device that is dedicated to opening the sliding door D. Also, when transmitting a reservation signal and a response signal, the mobile device 2 does not necessarily use a radio wave that is similar to the radio wave for an activation signal.

Also, the on-board device 1 may perform control to open the sliding door D depending on the detected positional relationship between the vehicle C and the mobile device 2. Specifically, even if the mobile device 2 is present within the range of 3 m from the sliding door D, the on-board device 1 does not open the sliding door D if the mobile device 2 is not present at a position toward which the outer surface of the sliding door D faces. For example, the on-board device 1 does not open the sliding door D if the user is present at a position toward which a vehicle door on the passenger seat side faces. Therefore, when the user does not intend to open the sliding door D and intends to open a vehicle door on the passenger seat side, the sliding door D is prevented from being erroneously opened, and security is not impaired. Therefore, the on-board device 1 can perform more flexible control compared to control that is performed to open the sliding door D simply depending on whether or not the mobile device 2 is present within a predetermined communication range.

Also, the on-board device 1 transmits position detection signals from a plurality of LF transmission antennas 3 that are provided in the vehicle C. In the case of receiving a plurality of position detection signals, the mobile device 2 can increase the amount of information that can be contained in a response signal to be transmitted, compared to the case of receiving one position detection signal. Therefore, the on-board device 1 can accurately detect the positional relationship between the vehicle C and the mobile device 2. Also, the on-board device 1 can accurately detect the positional relationship based on the reception signal strength that is contained in the response signal.

Although the mobile device 2 according to the present embodiment is described as being provided with the reservation switch 26 that accepts an operation pertaining to the transmission of a reservation signal, if a configuration for accepting an operation pertaining to the transmission of a reservation signal is provided, the mobile device 2 is not necessarily provided with a configuration that is dedicated to the transmission of a reservation signal. For example, the mobile device 2 may be provided with a switch for locking or unlocking a vehicle door of the vehicle C so that the switch serves as a component that corresponds to the acceptance unit. If this is the case, the mobile device 2 transmits a reservation signal upon the switch accepting a predetermined operation such as a long press, and thus the switch can be realized as a configuration that corresponds to the acceptance unit.

Although the on-board device 1 according to the present embodiment is described as being configured to perform communication pertaining to the detection of the location of the mobile device 2, with the mobile device 2, to output a door open instruction signal, upon receiving a reservation signal, the on-board device 1 may perform another kind of communication with the mobile device 2, to output the signal. Another kind of communication is, for example, communication pertaining to verification regarding whether or not the mobile device 2 corresponds to the on-board device 1, communication pertaining to the verification and the detection of the location, or the like. That is, the other kind of communication needs only be communication that is performed to specify one or more relationships between the on-board device 1 and the mobile device 2.

Although the positional relationship between the vehicle C and the mobile device 2 according to the present embodiment is described using a separation distance from the sliding door D to the mobile device 2 in a direction in which the sliding door D faces, another positional relationship may be employed. For example, various kinds of positional relationships such as the coordinates, direction, or the like of the position at which the mobile device 2 is present, relative to the position at which the vehicle C is present, may be employed. For example, the on-board device 1 may be configured to detect the three-dimensional coordinates of the mobile device 2 or the two-dimensional coordinates of the mobile device 2 in a horizontal plane, relative to the vehicle C at the origin. Also, the predetermined positional relationship may be a combination of various positional indices that indicate a distance, coordinates, a direction, and so on.

Although the on-board device 1 according to the present embodiment is described as being configured to open the sliding door D depending on the positional relationship between the vehicle C and the mobile device 2, the door to be opened may be any of the vehicle doors provided for the vehicle C. For example, the on-board device 1 may perform control to open a vehicle door that is provided for the trunk of the vehicle C, depending on the positional relationship.

The invention claimed is:

1. A vehicle communication system comprising: an on-board device that outputs a control signal for opening a vehicle door; and a mobile device that transmits a reservation signal pertaining to a reservation for opening the vehicle door to the on-board device, the on-board device outputting the control signal by performing predetermined communication with the mobile device upon receiving the reservation signal, wherein the mobile device comprises:
a mobile transmission unit that transmits the reservation signal;
an acceptance unit that accepts an operation pertaining to transmission of the reservation signal; and a transmission control unit that causes the mobile transmission unit to repeatedly transmit the reservation signal upon the acceptance unit accepting the operation, the on-board device comprises:

an on-board reception unit that receives the reservation signal; and an on-board transmission unit that transmits a position detection signal pertaining to detection of a position of the mobile device upon the on-board reception unit receiving the reservation signal, the mobile device further comprises a mobile reception unit that receives the position detection signal transmitted from the on-board transmission unit, and if the mobile reception unit receives the position detection signal, the transmission control unit does not cause the mobile transmission unit to transmit the reservation signal.

2. The vehicle communication system according to claim 1, wherein the mobile device further comprises a timer that measures a period during which the reservation signal is repeatedly transmitted, and if the period measured by the timer is longer than or equal to a predetermined period, the transmission control unit does not cause the mobile transmission unit to transmit the reservation signal.

3. The vehicle communication system according to claim 2, wherein the mobile transmission unit transmits an activation signal for activating a driving source of a vehicle on which the on-board device is mounted, to the vehicle.

4. The vehicle communication system according to claim 1, wherein the transmission control unit causes the mobile transmission unit to transmit a response signal that corresponds to the position detection signal received by the mobile reception unit, the on-board reception unit is configured to receive the response signal, the on-board device further comprises:

a detection unit that detects a positional relationship between the mobile device and a vehicle on which the on-board device is mounted, upon the on-board reception unit receiving the response signal, based on the received response signal; and an output unit that outputs the control signal for opening the vehicle door if the positional relationship detected by the detection unit indicates that a distance between the mobile device and the vehicle is shorter than or equal to a predetermined distance.

5. A mobile device that transmits, to an on-board device that outputs a control single for opening a vehicle door, a reservation signal pertaining to a reservation for opening the vehicle door, the mobile device comprising:

a mobile transmission unit that transmits the reservation signal;

an acceptance unit that accepts an operation pertaining to transmission of the reservation signal;

a transmission control unit that causes the mobile transmission unit to repeatedly transmit the reservation signal upon the acceptance unit accepting the operation; and a mobile reception unit that receives a position detection signal that has been transmitted from the on-board device that has received the reservation signal, the position detection signal pertaining to detection of a position, wherein, if the mobile reception unit receives the position detection signal, the transmission control unit does not cause the mobile transmission unit to transmit the reservation signal.

6. The mobile device according to claim 5, wherein the mobile transmission unit transmits an activation signal for activating a driving source of a vehicle on which the on-board device is mounted, to the vehicle.

* * * * *